(12) United States Patent
O'Conner

(10) Patent No.: US 6,204,802 B1
(45) Date of Patent: *Mar. 20, 2001

(54) APPARATUS FOR DETECTING RELATIVE VELOCITY

(76) Inventor: Joe Scott O'Conner, Tulpenstrasse 5, 7798 Aach-Linz (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/330,335

(22) Filed: Feb. 5, 1993

Related U.S. Application Data

(63) Continuation of application No. 07/793,023, filed on Nov. 15, 1991, now abandoned.

(51) Int. Cl.[7] .................................................. G01S 13/93

(52) U.S. Cl. ........................... 342/70; 342/101; 342/103; 342/114; 342/196

(58) Field of Search ............................. 342/70, 114, 115, 342/196, 101, 98, 99, 103

(56) References Cited

U.S. PATENT DOCUMENTS

| | | | |
|---|---|---|---|
| 3,003,117 | * 10/1961 | Stavis | 342/101 |
| 3,118,139 | 1/1964 | Durstewitz . | |
| 3,176,294 | * 3/1965 | Merlo et al. | 342/70 |
| 3,218,641 | * 11/1965 | Maynard | 342/101 |
| 3,697,985 | * 10/1972 | Faris et al. | 342/70 |
| 3,742,497 | * 6/1973 | Sato et al. | 342/70 |
| 3,778,826 | * 12/1973 | Flannery et al. | 342/71 |
| 4,079,377 | * 3/1978 | Zur Heiden et al. | 342/109 |
| 4,200,870 | * 4/1980 | Gabbitas | 342/28 |
| 4,231,039 | * 10/1980 | Fritzlen et al. | 342/103 X |
| 4,335,383 | * 6/1982 | Berry | 342/103 X |

FOREIGN PATENT DOCUMENTS

| | | |
|---|---|---|
| 662660 | 10/1987 | (CH) . |
| 2558144 | 7/1976 | (DE) . |
| 2654660 | 11/1980 | (DE) . |
| 3222263 | 2/1983 | (DE) . |
| 3238022 | 5/1983 | (DE) . |
| 3337135 | 5/1984 | (DE) . |
| 3222900 | 5/1985 | (DE) . |
| 2835867 | 2/1990 | (DE) . |

OTHER PUBLICATIONS

Raudonat et al, "Mehrzielfäbiges FM–CW–Rador zur eindeutigen Messung von Entfernung und Geschwindigkeit" see Abstract.*

Heiden et al., "Radar Anticollision Warning System for Road Vehicles", Electrical Communications, pp. 141–145 (U.S.A. 1977).

Dutine, "A Contribution to the Application of Doppler Radar Technique in Road Traffic", Frequenz, pp. 38–45 (Dex. 1983).

"A New Approach—Warning Apparatus for Vehicles", Funkschau, pp. 155–156 (Germany 1974).

(List continued on next page.)

Primary Examiner—Gilberto Barrón, Jr.
(74) Attorney, Agent, or Firm—James Creighton Wray; Meera P. Narasimhan P. Narasimhan

(57) ABSTRACT

In order to produce relative velocity signals in accordance with the relative velocity between a following and a preceding vehicle, a Doppler signal transmitter, which targets the preceding vehicle, is attached to the following vehicle. The thus obtained Doppler signals impinge on a signal processor which analyzes the frequency spectrum of the Doppler signal. Velocity signals are formed from the frequencies within this frequency spectrum, which frequencies lie outside the range of those frequencies caused by the velocity of the following vehicle moving relative to the surface.

9 Claims, 6 Drawing Sheets

OTHER PUBLICATIONS

"Low Cost Monolithic Voltage–to–Frequency Converter", V/F & F/V Converters, pp. 41–42 (U.S.A.).

"MF4 4th Order Switched Capacitor Butterworth Lowpass Filter", National Semiconductor Corp., pp. 13–16 (U.S.A.).

"MF6 6th Order Switched Capacitor Butterworth Lowpass Filter", National Semiconductor Corp., pp. 41–44 (U.S.A.).

"Plessey Oscillators and Doppler Modules for Industrial and Commercial Use", Plessey, pp. 2–15 (U.S.A.).

"Lowpass Filters of the 5th Class without Offset Charge Errors", Maxim, pp. 1–12 (Germany 1989).

"Phase Locked Loop", Motorola, p. 13 (U.S.A.).

"TMC2310", TRW, pp. 1–5 (U.S.A. 1989).

"GDHM 32, GDSM 32, ANT 200 Series, SDM 31", Plessey, pp. 1–4 (U.S.A. 1984).

"Integrated Circuit Voltage–to–Frequency Converter", V/F & F/V Converters, p. 1 (U.S.A. 1989).

* cited by examiner

APPARATUS FOR DETECTING RELATIVE VELOCITY

This application is a continuation of Ser. No. 07/793,023 Nov. 15, 1991, now abandoned.

The present invention relates to an apparatus for producing velocity signals in accordance with the relative velocity between a first and a second unit while both are moving relative to a surface, by means of a Doppler signal transmitter which is attached to the first unit and targets the second unit, and a signal processor which is impinged on by the Doppler signal.

The present invention particularly relates to an apparatus which is built into a vehicle and which emits a signal when the distance relative to a preceding vehicle decreases and the preceding vehicle has a critical relative velocity.

BACKGROUND OF THE INVENTION

Relative velocities can be determined by means of a Doppler radar. Emitted radar waves are reflected off of the object which is to be measured. The measured frequency of the reflected radar wave is diferent from the frequency of the emitted radar waves owing to the Doppler effect. This diference is in proportion to the relative velocity between the unit which sends and receives radar waves and the object which is to be measured and reflects the radar waves. The frequency change is obtained as a beat frequency by merging the emitted and the reflected signals. This frequency is designated as a "Doppler frequency." A laser can also be used instead of a radar. In this way, a Doppler frequency associated with the relative velocity is also obtained in a similar fashion. Another possiblity for measuring the relative velocities consists in measuring the Doppler frequency of sound waves emitted by an acoustic transmitter.

"Doppler modules" are commercially available components and are, for example, described in a company publication PS 6043 Issue 1 10 80 "Plessey Oscillators and Doppler Modules for Industrial and Commercial Use" published by Plessey Opto-electronics and microwave Ltd.

Various arrangements of such Doppler modules for room monitoring as "photoelectric barriers" or for the automatic control of gates are also described in the mentioned publication. Furthermore, this publication also describes the use of such a Doppler module for measuring velocity.

The previously mentioned Plessey publication further describes a Doppler module with two mixer diodes which supply Doppler signals phase shifted by 90°. Not only can the velocity of a reflecting object relative to the Doppler module be determined from these Doppler signals but the direction of the movement as well. Approaching and receding objects can thus be differentiated.

Doppler modules using radar are used for monitoring traffic in order to determine if the speed limit is exceeded, see, for example Swiss Patent No. 662 660.

During use, this Doppler module is arranged in a stationary fashion. The backgrou nd and surface do not produce a Doppler frequency. The Doppler frequency only originates from moved objects, e.g. from the motor vehicles which are to be monitored.

Through "Funkschau" 1974, Vol. 5, pages 1955 to 1956, an apparatus is known which is intended to prevent collisions between motor vehicles and obstacles with the help of a radar device and a signal processor. Using this known apparatus, the vehicle's distance from the obstacle and the vehicle's velocity relative to the obstacle and to the road is measured by means of the radar device. Depending on the stored values which relate to the assumed road condition, and with the help of a decision circuit, a criterion is formed to test if the vehicle approaches the obstacle at a dangerously high speed.

In doing this, it is necessary that the radar device virtually targets such an obstacle only and not the other stationary elements of the background and surface. That excludes, though, a long-range radar beam. Also, with a closely bunched radar beam, a false alarm is triggered when the vehicle drives through a curve where objects which reflect the radar signal, e.g. trees, houses, warning sign posts, lampposts, or crash barriers, stand along the side of the road.

From German Patent No. 2 654 660 there is known a method for preventing collisions between road vehicles and obstacles. Therein, the position of the vehicle's steering wheel is additionally adjusted in order to avoid false alarms. The vehicle's velocity and the steering wheel position form addresses and define a memory location of a memory unit subdivided into lines and columns. A set of input variables is stored at this memory location. A comparator compares the distance detected by the radar device with a minimum distance read out from the memory unit. Such an arrangement is complicated. It requires a radar distance measurement. It does not detect the case where, for example, the vehicle drives in a straight line towards a curve without the vehicle's steering wheel first being turned. It is also assumed here that the radar device normally only detects a potential obstacle but not the remaining background and surface, e.g. the road surface or roadside trees.

German Published Patent Application No. 2 558 144 which is cognate with the Japanese Published Patent Application Number 50-1561, relates to a method for cutting out undesired echo signals which are reflected by false targets in a controlled zone with the emission of a radar beam from a motor vehicle as it passes the controlled zone. To this end, markers are fixed at the entrance and exit of the controlled zone. The markers at the entrance are scanned when the motor vehicle drives into the controlled zone. Due to this scanning operation, the scanning range of the signals reflected by stationary objects in the controlled zone is reduced. When the motor vehicle drives out of the controlled zone the markers at the exit are scanned. The scanning range is thereby returned to its normal value.

This method can also be used for traffic monitoring with a stationary radar device.

Through the company publication MAX 280/LTC 1062 of the SE Spezial-Electronic KG, Kreuzbreite 14, D-3062 Bückeburg,, Germany, a fifth-order low-pass filter without offset voltage in the form of a chip is known. The frequency limit of this filter is determined by internal clock pulses which can be overridden by external clock pulses. Such low-pass filter enables the frequency limit of the filter to be altered depending on an external signal. National Semiconductor of Santa Clara, Calif., make switched capacitor filters of the type MF4 and MF6 which also allow the upper frequency limit to be determined by external clock pulses. The MF4 and MF6 devices are described in the National Semiconductor Data Acquisition Handbook.

Through a catalogue from Motorola, No. MC 14046 B, a phase locked loop designed as an integrated circuit is known. Such phase locked loop has two phase comparators, a voltage-controlled oscillator, a current source-follower and a Zener diode. The phase comparators compare two signal inputs in the form of frequencies. The first phase comparator, an exclusive OR-element, supplies a digital actuating signal and maintains a phase shift by 90° at the medium frequency between the two signal inputs. The second phase comparator has a logic unit reacting to the leading edge, and supplies complementary digital actuating signals and maintains the signals at the two signal inputs in phase. The linear, voltage-controlled oscillator produces an output signal whose frequency is determined by an applied voltage.

Through a company publication "TMC 2310" of TRW LSI Products, Inc., a processor is known by which a Fourier transform of an input signal progression can be quickly determined and stored (FFT=Fast Fourier Transform).

SUMMARY OF THE INVENTION

It is one object of the invention to develop an apparatus of the initially mentioned type for producing velocity signals in accordance with the relative velocity between a first and a second unit while both are moving relative to the surface, in such a simple manner that no interfering or false signals are produced due to the relative velocity between the first unit and the surface.

It is a further object of the invention to improve the range of an apparatus of the initially mentioned type without such interfering signals.

A special object of the invention consists in providing a simple and inexpensive warning device for vehicles and which warning device supplies a signal when the vehicle approaches a preceding vehicle at a certain, dangerous speed.

The foregoing and other objects are achieved by means of an apparatus of the initially mentioned type in which the signal processor, among other things, is equipped for the analysis of a Doppler signal frequency spectrum and for the production of velocity signals from frequencies which lie within this frequency spectrum but outside the range of those frequencies caused by the velocity of the first unit moving relative to the surface.

The signal processor is designed such that it carries out an analysis of the Doppler signal frequency spectrum. During such analysis, each frequency corresponds to a relative velocity between the Doppler signal transmitter, e.g. the radar module on the first unit, a vehicle, for example. As a result, there our Doppler signals which, for example, originate from the second unit, i.e. from a vehicle driving in front and thus in motion. Doppler signals also occur, however, which are reflected by the background or surface such as roadside trees, road surface, houses, etc. The background and surface are undoubtedly stationary but, since the first unit is in motion relative thereto, a Doppler effect still occurs which leads to a Doppler frequency. This last Doppler frequency, however, is higher than the Doppler frequency which is caused by a second unit moving in the same direction as the first unit, at least by the first unit's approach to the second. The relative velocity of the first and the second units driving in the same direction is the difference of the two velocities. The invention suppresses the background and surface velocity signals formed from frequencies which lie outside the range of the Doppler frequency caused by the surface. The distance to the second unit is not measured with the invention.

BRIEF DESCRIPTION OF THE DRAWINGS

Exemplary embodiments of the invention are explained in greater detail hereinbelow with reference to the accompanying drawings wherein.

DETAILED DESCRIPTION OF THE PREFERRED EMBODIMENTS

Figure 1:
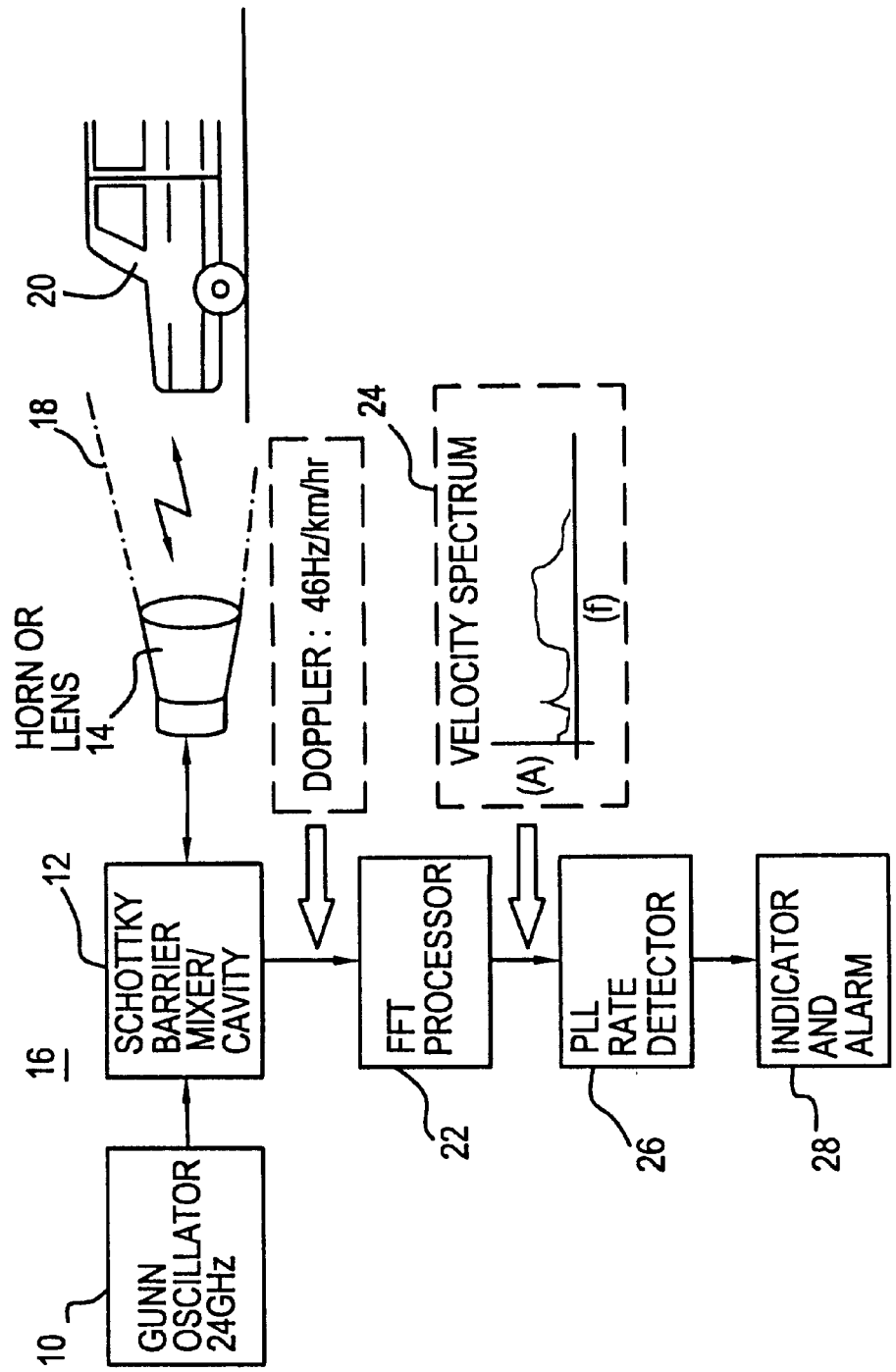
FIG. 1 is a schematic illustration containing a block diagram of a first exemplary embodiment of the inventive apparatus reacting to the approach of a vehicle driving in front, which apparatus uses a fast Fourier transform (FFT) of the Doppler signals in order to produce a frequency spectrum or a velocity spectrum, as the case may be.

In FIG. 1 a Gunn oscillator is designated by 10, which oscillator generates electromagnetic oscillations with a frequency of 24 GHz. A cavity with Schottky diodes and a mixer 12 is connected to the Gunn oscillator. The cavity sends and receives radar beams. The emitted radar beams are concentrated by means of a horn 14. The parts 10, 12, and 14 form a radar module 16 of the type as already described in the abovementioned Plessey publication. Such radar module is commercially available under the model designation GDSM from Plessey Opto-electronics and Microwave Ltd., Wood Burcote Way, Towcester, Northhamptonshire, NN 12 7JN.UK.

The Doppler module 16 is mounted on a (here not shown) first unit moving relative to a surface such as, for example, a motor vehicle. The emitted radar beam 18 impinges on a second unit 20 moving relative to the surface, for example, a second motor vehicle which is moving on the surface in the same direction as the first unit or vehicle. The radar beam 18 is reflected by the second unit 20 and is partially received by the radar module 16. Because of the relative velocity between the first and second units, the reflected radar beam is subject to a frequency shift due to the Doppler effect. This Doppler frequency shift is $$\Delta f = 2v\frac{F}{C}$$

wherein $\Delta f$ is the Doppler frequency shift, v is the relative velocity of the two units, F is the radar wave frequency and C is the light velocity. In a tested arrangement, this Doppler frequency shift amounts to 46 Hz per km/h. By means of the mixer this Doppler frequency shift is obtained in known manner as a beat frequency, the so-called "Doppler frequency", in a "Doppler signal." If several differently moved objects are simultaneously detected by the radar beam, then, Doppler signals having different Doppler frequencies occur from the differently reflected radar beams.

The thus obtained Doppler signals are processed in the embodiment as shown in FIG. 1 by Fourier transform means in the form of an FFT processor 22 (FFT=Fast Fourier Transform). Such FFT processor 22 supplies and stores a frequency spectrum, i.e. the Fourier transform, of the received Doppler signals. According to the formula shown above, each frequency is associated with a relative velocity. The frequency spectrum, as shown in FIG. 1 and indicated in block 24, therefore represents a spectrum of the relative velocities. A frequency range is selected from this frequency or velocity spectrum to produce warning signals. Such selected frequency is selected from a range which does not contain the frequencies caused by the velocity of the first unit or vehicle relative to the surface. This will be more closely described in connection with FIG. 2.

Figure 2:
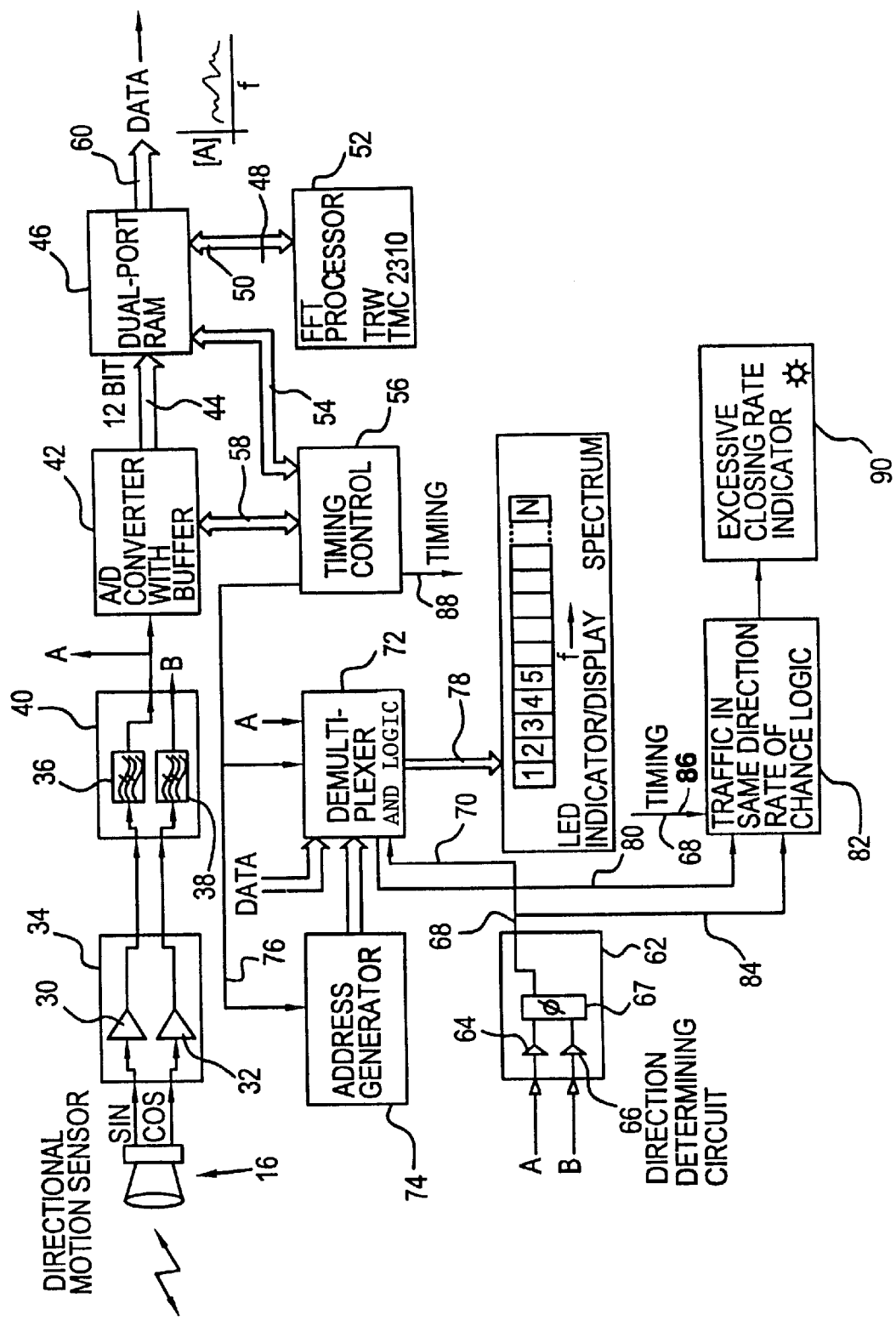
FIG. 2 is a highly detailed representation of the apparatus shown in FIG. 1.

In the embodiment as shown in FIGS. 1 and 2, a circuit element 26 is provided. The frequency spectrum is applied thereto for detecting changes in this frequency spectrum. Such changes naturally indicate a change in the relative velocity between the first and the second unit, i.e. an acceleration. When the approach speed of the unit or vehicle with the radar module 16 increases in relation to the preceding unit or vehicle 20, that means that the unit or vehicle 20 is braking. In this case the circuit element 26 triggers an indicator or an alarm on an indicating or alarm device 28.

The arrangement is extensively depicted in FIG. 2.

The radar module 16 contains as a Doppler signal transmitter, as described in the abovementioned Plessey publication, two mixer diodes which are arranged such as to supply two output signals which are phase shifted by 90°. These two signals are designated SIN and COS and are amplified by means of respective amplifiers 30 and 32 in a circuit element 34 and filtered by means of respective low-pass filters 36 or 38, as the case may be, in a filter circuit 40. Two output signals A and B are obtained in this way.

The output signal A is connected by means of an analog-to-digital converter 42 with buffer via a 12 bit data line 44 to a direct access memory 46 having two ports (Dual Port RAM). The direct access memory 46 is connected via a data line 50 to an FFT processor 52 for the Fourier analysis of the Doppler signals. The direct access memory is connected via a second data line 54 to a timing-and-control unit 56. The timing-and-control unit 56 is also connected to the analog-to-digital converter 42 via a data line 58.

The Doppler signals appearing as a function of time are digitized by means of the analog-to-digital converter 42 with a pulse determined by the timing-and-control unit, and with this pulse, are then taken out of the buffer over into the direct access memory. The FFT processor 52 receives via the data line 50 the digitally stored time progression of the Doppler signals and forms the Fourier transform of the same, i.e. the frequency spectrum. This Fourier transform is again read into the direct access memory 46 as a data set, now representing the amplitude as a function of frequency, via the data line 50. This data is serially output via a data output 60 of the direct access memory 46.

Figure 3:
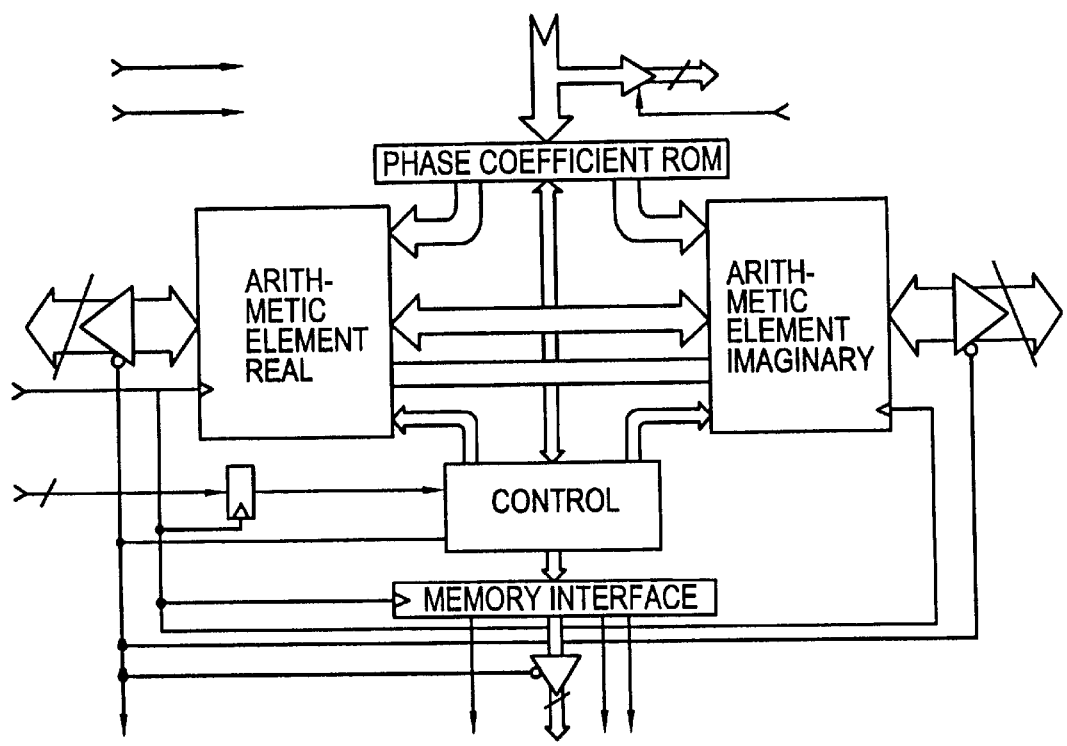
FIG. 3 is a functional block diagram of an FFT processor of the apparatus shown in FIG. 2.

The FFT processor 52 is a known component in itself. An FFT processor is described in the abovementioned company publication of TRW LSI Products and is available from this company under the product number TMC 2310. The FFT processor is depicted in FIG. 3 as a block diagram.

Both the filtered output signals A and B, virtually the velocity-dependent Doppler signals with the beat frequencies, are switched onto a direction-determining circuit element 62. The circuit element 62 contains amplifiers 64 and 66 for each of the signals as well as a phase detector 67 (Quadrature Φ Detect) which reacts to the interrelated phase relations of the two signals A and B and which supplies a dual signal therefrom to an output 68, which dual signal indicates the direction of the relative velocity; it thus indicates if the first unit or vehicle approaches the second unit or vehicle or if the second unit or vehicle moves away from the first unit or vehicle. Only the first situation is critical. This signal is switched onto a demultiplexer-logic circuit 72 via a line 70.

The demultiplexer-logic circuit 72 serially obtains the data from the data output 60. The demultiplexer-logic circuit 72 furthermore obtains addressses from an address generator 74 as well as the filtered output signal A. The address generator 74 is controlled by the timing-and-control unit 56 via a line 76. At a data output 78 the demultiplexer-logic circuit supplies data related to the energy of the Doppler signals, which energy occurs in the different frequency ranges. This is indicated by means of a liquid crystal or luminous diode indicator as a function of the frequency (or velocity). In this manner, only those Doppler frequencies are indicated which correspond to the situation where the first unit approaches the second unit.

The demultiplexer-logic circuit 72 also supplies an output signal to a line 80, which signal indicates that a Doppler frequency within the frequency spectrum substantially changes whereby, therefore, a relative acceleration between the first and the second unit is established. It can be deduced from the signal at the output 68 of the direction-determining circuit element 62 whether the second unit is moving in the same direction as the first unit. A circuit element 82 receives, via the line 80, the output signal from the demultiplexer-logic circuit and, via the line 84, the signal from the output 68 of the circuit element 62. A timing signal from an output 88 of the timing-and-control unit 56 also lies at an input 86. The circuit element 82 triggers a signal device 90, e.g. a warning light, when the approach speed to a preceding vehicle changes; when, therefore, a change in the relative velocity occurs (line 80) and the relative velocity corresponds to an approach. A signal is consequently triggered when the preceding unit or vehicle brakes but, however, not when the preceding unit or vehicle accelerates or when the following unit or vehicle brakes.

The FFT processor is depicted in FIG. 3 in a block diagram.

Figure 4:
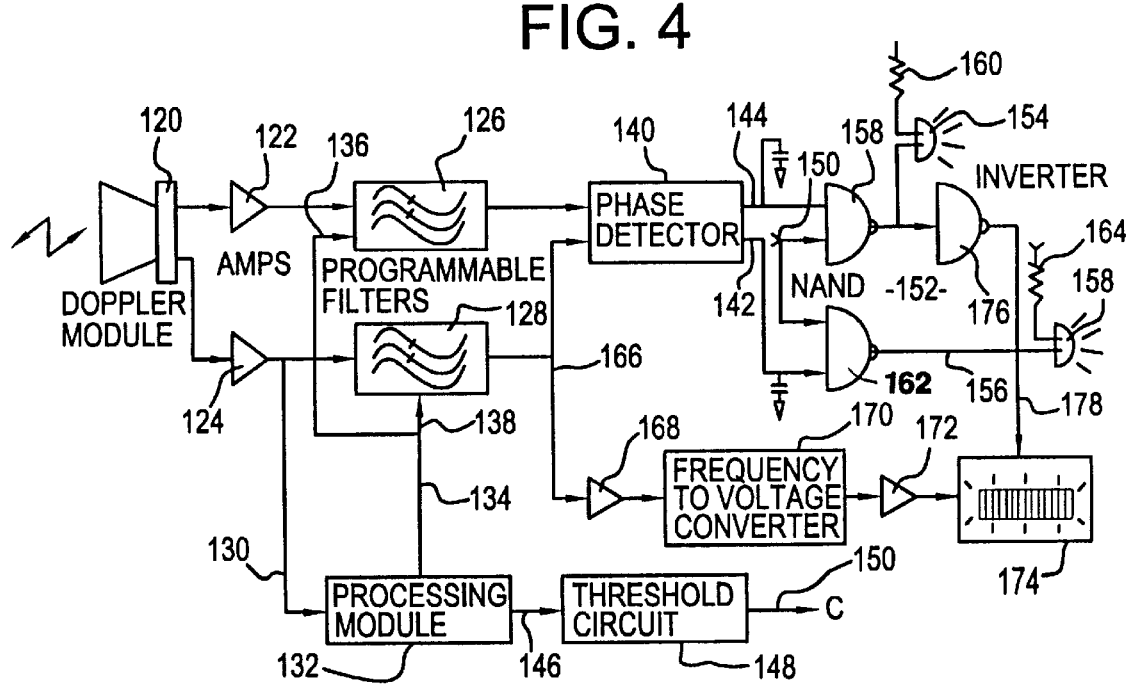
FIG. 4 shows as a block diagram of a second exemplary embodiment of the inventive apparatus reacting to relative velocity and using programmable filters.

FIG. 4 shows a second exemplary embodiment of the inventive apparatus operating with programmable filters.

A radar module 120 supplies, in a fashion similar to the apparatus shown in FIG. 1 and 2, two Doppler signals phase shifted by 90° which are designated SIN and COS. The Doppler signals SIN and COS are amplified by respective amplifiers 122 or 124, as the case may be, and switched onto respective programmable low-pass filters 126 or 128. In addition, after it has been amplified in the amplifier 124, the Doppler signal COS is switched via line 130 to velocity-determining means 132 in the form of a processing module. The processing module is more closely described hereinbelow. The processing module supplies an output frequency to a line 134. This output frequency is present at the control inputs 136 and 138 of the programmable filters 126 or 128, respectively.

Figure 5:
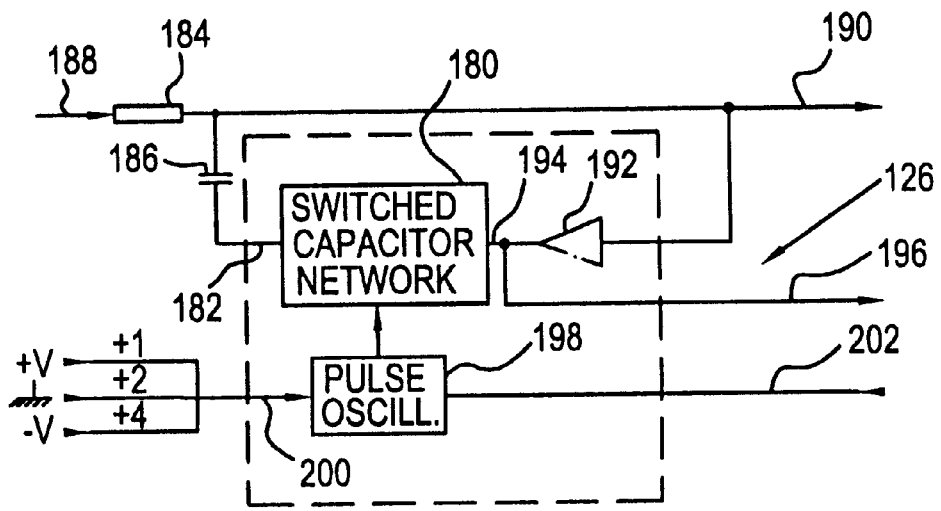
FIG. 5 is a block diagram of a programmable filter of the apparatus shown in FIG. 4.

The programmable filters 126 and 128 are known components in themselves. The filters are described in the abovementioned company publication of Spezial-Electronic KG. They are commercially available under the model designation MAX 280/LTC 1062 from the company Spezial-Electronic KG, Kreuzbreite 14, D-3062 Bückeburg, Germany. The structure of such filter is depicted in FIG. 5 in a block diagram and described herein-below.

The filters 126 and 128 are fifth-order low-pass filters. The frequency limit of these low-pass filters is determined by the output frequency of the processing module, which frequency is available to the control inputs 136 and 138 via the line 134. The programmable filters 126 and 128 are controlled such that the frequency limit is lower than the Doppler frequency which corresponds to the velocity of the following unit or vehicle moving on the surface. The Doppler signals which are caused by the movement of the radar module with the following unit or vehicle, i.e. the "first unit", moving on the surface and relative to stationary objects such as trees, are thereby suppressed. The Doppler signals which are let through by the filters 126 and 128, therefore, originate only from moved objects.

The Doppler signals which are phase shifted by 90° are switched into a phase detector 140 by the two filters 126 and 128. The phase detector 140 substantially corresponds to the phase detector 67 found in FIG. 2. The phase detector 140 contains a flip-flop which goes into one or the other switching position depending on whether the relative velocity is caused by a change in the velocity or distance of the preceding unit or vehicle. In the first case, the output terminal 142, which is depicted in FIG. 2 as the lower terminal of the phase detector 140, is in the postion H (high) and the upper output terminal 144 is in the position L (low). In the case of an increase in the distance, the lower output terminal 142 of the phase detector 140 is in position L and the upper output terminal is in position H.

The processing module 132 further supplies at the output 146 an output signal which is a measure of the energy, present in the frequency band of interest here, of the Doppler signal. This output signal impinges on a threshold circuit 148. The threshold circuit 148 produces at an output 150 a logic signal H when the output signal of the processing module 132 exceeds the threshold value. The signal at the output 150 (H or L) is designated in FIG. 4 with "C."

The signal "C" and the logic output signals at the two outputs 142 and 144 are present in a logic circuit 152. The logic circuit controls two signal lights 154 and 156. The signal light 154 is green and indicates that the distance to the unit or vehicle driving ahead is increasing. The signal light 156 is red and indicates that the distance to the unit or vehicle driving in front is decreasing. The logic circuit 152 contains a first NAND-element 158. The "upper" output 144 of the phase detector 140 is available at an input of the first NAND-element 158. The signal "C" from the output 150 of the threshold circuit 148 lies at the other input of the first NAND-element. A terminal of the green signal light 154 lies at the output of the NAND-element 158. The other terminal of the signal light 154 lies, through a protective resistor 160, at a voltage of +5 volts. This voltage corresponds to the position "H." The logic circuit 152 further contains a second NAND-element 162. The "lower" output 142 of the phase detector 140 lies at an input of the second NAND-element 162. The signal "C" from the output 150 of the threshold circuit 148 likewise lies at the other input of the second NAND-element 162. A terminal of the red signal light 156 lies at the output of the NAND-element 162. The other terminal of the signal light 156 lies, via a protective resistor 164, likewise at a voltage of +5 volts.

When the upper output 144 of the phase detector 140 is in the position H and the lower output 142 is in the position L, and when, furthermore, the signal "C" is in the position H, i.e. an object is detected, the output of the NAND-element 158 is in the position L, such as ground, for example. In this case the signal light 154 and the protective resistor 160 have a voltage of 5 volts. The green signal light lights up. The position "L" from the lower output of the phase detector 140 lies at the "lower" input of the second NAND-element 162.

The output of the NAND-element 162 is therefore at "H", that is, has +5 volts. There is no potential difference, therefore, at the red signal light 156 and the protective resistor 165. The red signal light 156 remains unlit. The reverse occurs when the "upper" output 144 of the phase detector 140 is in the position H and the "lower" output 142 is in the position L. In this case the red signal light 156 lights up. The green signal light remains unlit.

The Doppler signal from the output of the programmable filter 128 is further switched to a frequency-to-voltage converter 170 via a line 166 and an amplifier 168. The frequency-to-voltage converter 170 supplies a voltage proportional to the Doppler frequency and to the relative velocity. This voltage is present in an indicating device 174 via an amplifier 172. The indicating device 174 supplies with it an indication of the relative velocity between the preceding unit or vehicle and the following unit or vehicle. Only the approach speed should be detected, however, and not the velocity at which the preceding unit or vehicle moves away. For this reason the logic circuit 152 contains an inverter 176. The output of the NAND-element 158 lies at the inverter 176. When the output of the NAND-element 158 is in the position L, i.e. the green signal light lights up, the inverter 176 produces a signal H at its output. This signal triggers the indicating device 174 via a line 178.

The programmable filter 126 or 128 is depicted by a block diagram in FIG. 5. The programmable low-pass filter 126 contains a switched capacitor network 180. An input 182 of the capacitor network 180 is connected to a filter input 188 by means of a resistor 184 and a capacitor 186. An offset-free output voltage is tapped between the resistor 184 and the capacitor 186. This output voltage is present at a filter output 190. The output voltage lies at an input 194 via an amplifier 192 with an amplification of factor "1." The output of the amplifier 192 is further connected with a buffered filter output 196.

The switched capacitor network 180 is controlled by a pulse oscillator 198. The frequency of this pulse oscillator 198 can be altered by factors of 1, 2 or 4 by feeding a voltage of +V, 0 or −V to an input 200.

The upper frequency limit of this filter is determined by internal pulsing which can be adjusted by means of suitable wiring of the pulse oscillator 198 at an input 202. The internal pulse oscillator 198 can also be overridden by an pulse oscillator (clock). The programmable filter in this case is used with an external oscillator.

The processing module 132 contains a phase locked device having a voltage-to-frequency converter in a feedback circuit through which an output voltage proportional to a feed frequency is obtained. This output voltage is again converted by means of a voltage-to-frequency converter into a frequency with which the programmable filters 126 and 128 are triggered.

The phase locked device is a component commercially available from the company Motorola under the aforementioned model designation MC 14 046 B "Phase Locked Loop". The voltage-to-frequency converters are components commercially available from the company Analog Devices under the model designation AD 654 or AD 537.

Figure 7:
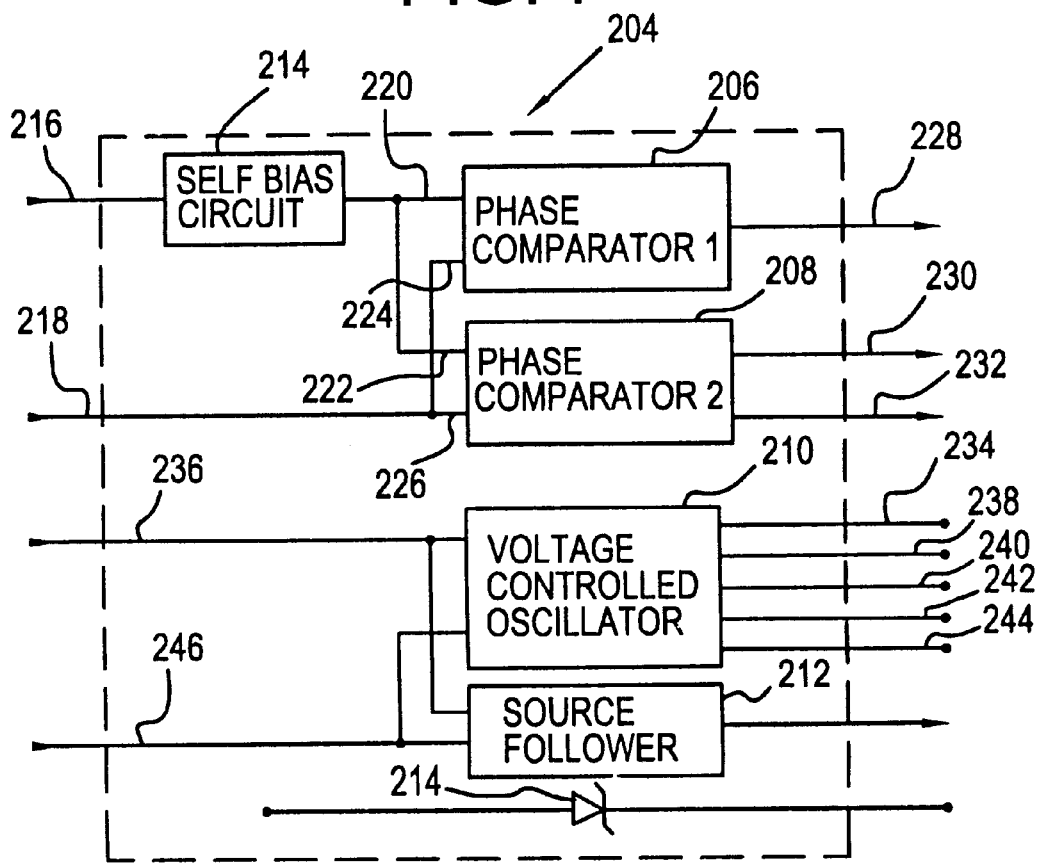
FIG. 7 is a block diagram of a phase locked loop in an apparatus of the type shown in FIG. 6.

The design of a phase locked device of the type used here is depicted by a block diagram in FIG. 7.

The phase locked device component 204 contains a first phase comparator 206 and a second phase comparator 208. The first phase comparator 206 is an exclusive OR-element. The phase locked device component 204 further contains a voltage-controlled oscillator 210 and a source-follower 212. A Zener diode 214 supports the regulation of the current supply. A self bias circuit 214 adjusts small voltage signals in the medium range of the amplifier.

The phase comparators 206 and 208 have two common signal inputs 216 and 218. Each of these signal inputs 216 and 218 is connected with inputs 220 and 222 or 224 and 226, respectively, of the two phase comparators 206 and 208.

The first phase comparator 206 supplies a digital fixed output signal at an output 228 and maintains a phase shift by 90° at the medium frequency between the signals at the inputs 216 and 218. The phase comparator 208 contains a logic unit for detecting the leading flank and supplies digital actuating signals at outputs 230 and 232 such that a zero phase shift of the signals at the inputs 216 and 218 is maintained.

The linear, voltage-controlled oscillator 210 produces, at an output 234, an output signal whose frequency is determined by a voltage at an input 236 as well as by the capacitors and resistors with which the component 204 is connected to clamps or pins 238 and 240 or 242 and 244, respectively. The source-follower 212 is required when the signal at the input 236 is required but the signal source can not be loaded. An inhibiting input 246 allows the oscillator 210 and the source-follower 212 to be switched off in order to reduce the current consumption.

Figure 8:
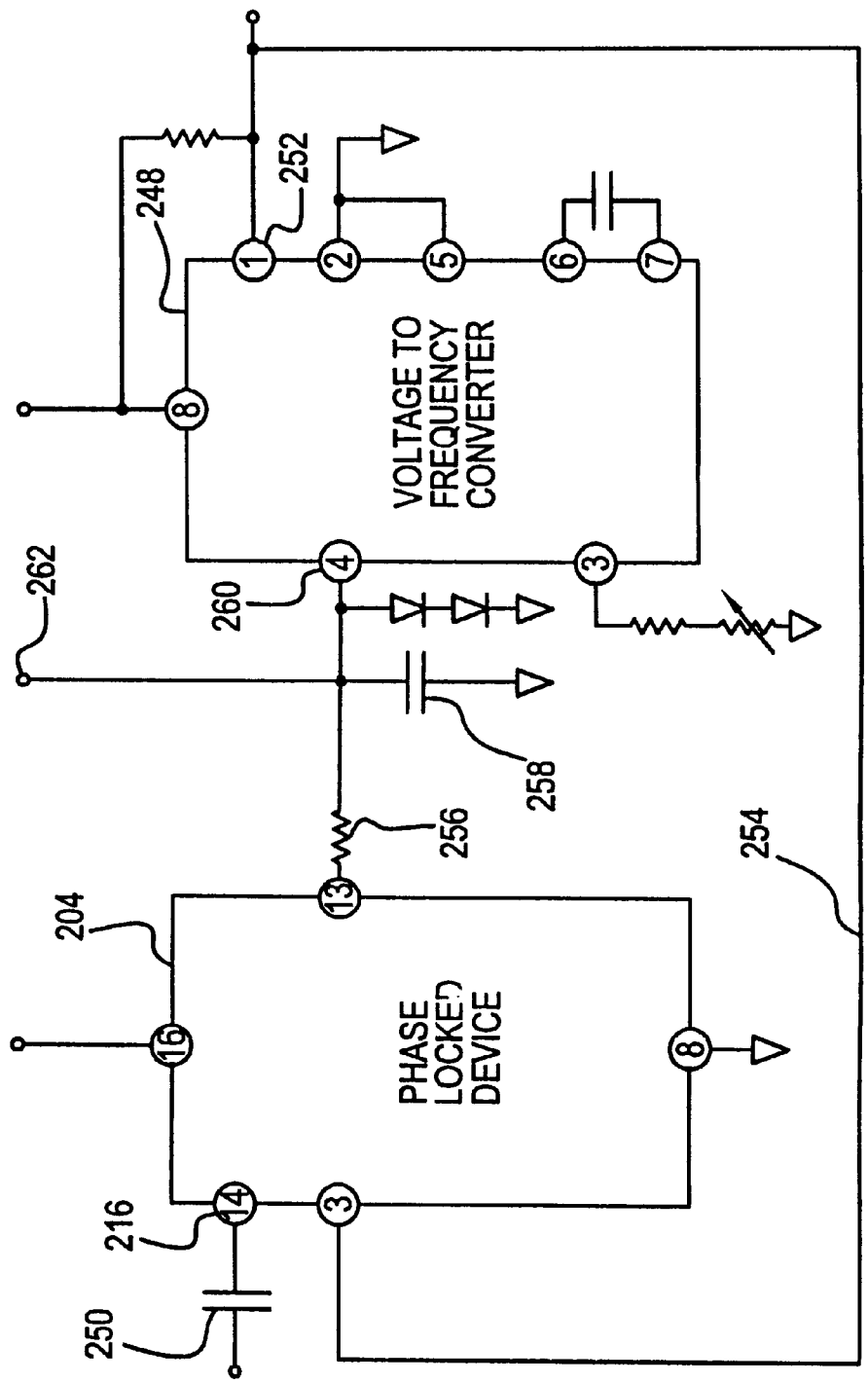
FIG. 8 shows the hook-up of a phase locked loop according to the one shown in FIG. 7 having a voltage-to-frequency converter in the return circuit of an output voltage.

Such phase locked device is interconnected in the manner depicted in FIG. 8 with the voltage-to-frequency converter 248 in the processing module 132. The voltage-to-frequency converter 248 is a component from the company Analog Devices with the model designation AD 654.

An input frequency, i.e. the unfiltered Doppler frequency, is then connected from the amplifier 124 (FIG. 4) via a capacitor 250 to the input 216 of the phase locked device 204. The output frequency of the voltage-to-frequency converter 248 from the output 252 is connected to the input 218 of the phase locked device 204 via a connection 254. The output 230 of the phase locked device 204 supplies an output signal which seeks to couple the output voltage of the voltage-to-frequency converter 248 locked-in phase to the input frequency at the input 216. This (digital) output signal is switched to the input 260 of the voltage-to-frequency converter 248 via an RC module having a resistor 256 and a capacitor 258. In this fashion a control operation takes place such that the voltage present at the capacitor 258 in the state of equilibrium causes an output frequency at the output 252 of the voltage-to-frequency converter 248 and which output frequency is equal to the input frequency at the input 216. This voltage is applied as frequency-proportional voltage to a clamp 262.

Since the input signals at the input 216 are still the unfiltered Doppler signals from the amplifier 124, these signals still contain that frequency which is caused by the movement of the vehicle on the surface relative to the background. The voltage at this clamp 262 is adjusted according to this frequency.

This voltage at the clamp 262 is now converted through another voltage-to-frequency converter into a frequency which determines the frequency limit of the programmable filters 126 and 128. In so doing, this frequency limit is selected to be lower by a certain percentage than the Doppler frequency caused by the velocity of the unit or vehicle moving on the surface. This Doppler frequency caused by the surface and background is, therefore, eliminated by the filters 126 and 128.

The frequency-to-voltage converter 170 operates in the same way as described in connection with FIG. 8. This one also contains a phase locked loop MC 14046 B in connection with a voltage-to-frequency converter AD 654.

Figure 6:
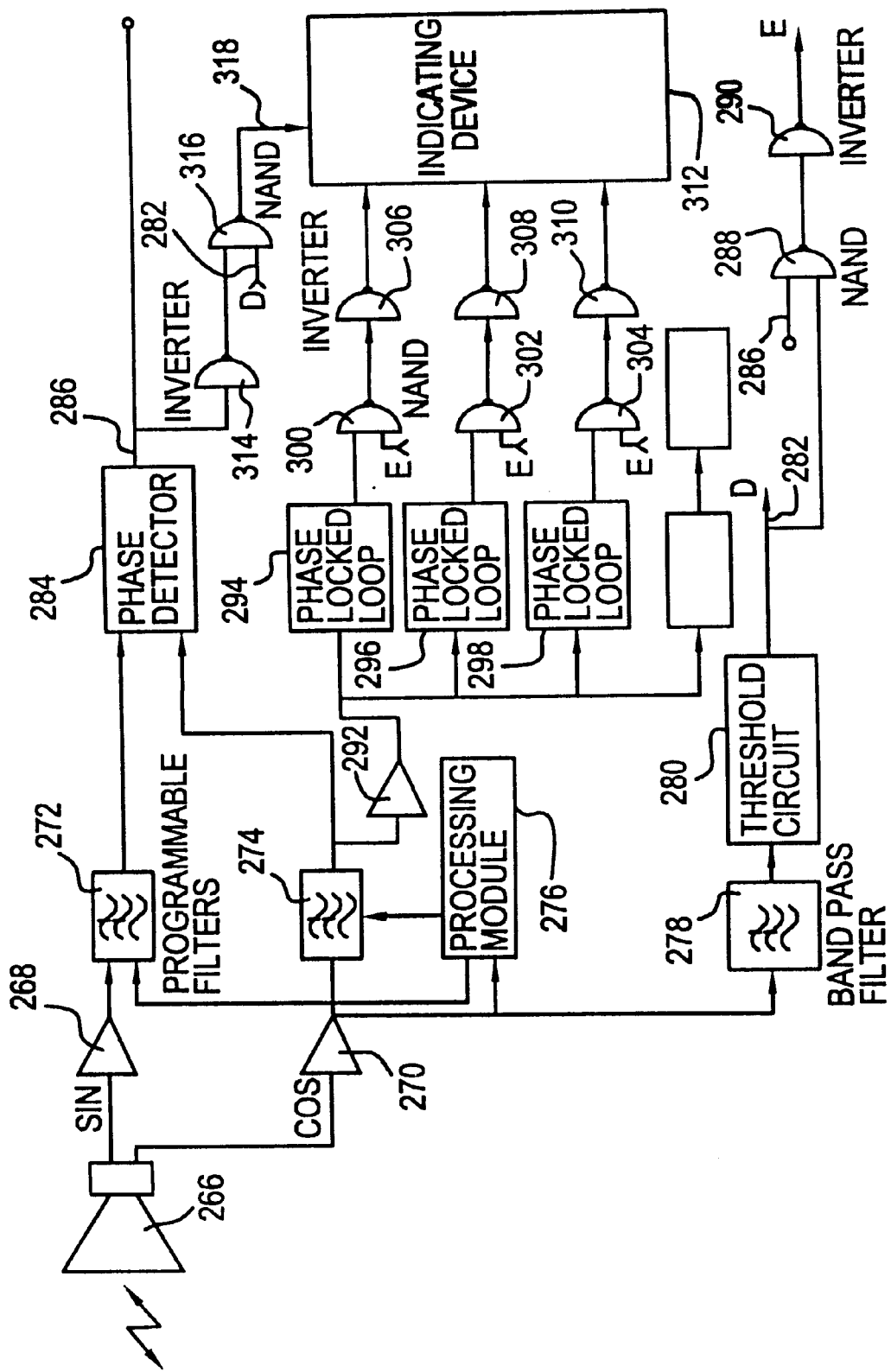
FIG. 6 is a block diagram of a third exemplary embodiment of the inventive apparatus reacting to relative velocities, which apparatus is similar to the apparatus containing programmable filters as shown in FIG. 4 and additionally uses phase locked loops.

In the third exemplary embodiment shown in FIG. 6, the radar module 266 again supplies two Doppler signals COS and SIN which are phase shifted by 90°. These Doppler signals are amplified by means of amplifiers 268 or 270 and connected to programmable filters 272 or 274, respectively. The programmable filters 272 and 274 are again fifth order low-pass filters of the type MAX 280/LTC 1062, as described above in connection with FIG. 5 or National Semiconductor MF4 and MF6 elements. The programmable filters 272 and 274 are controlled by a processing module 276 which receives the unfiltered Doppler signals and is designed in a fashion similar to that of the processing module 132 described above with reference to FIG. 4.

The unfiltered Doppler signal from the output of the amplifier 270 is further switched to a band-pass filter 278. The band-pass filter 278 is likewise an integrated MF4 or MAX 280/LTC 1062 circuit which is configured as a band-pass filter. A threshold circuit 280 supplies a logic signal "D" at an output 282, which signal indicates if a Doppler signal in the passed-through frequency range occurs at a sufficient amplitude.

The filtered Doppler signals from the programmable filters 272 and 274 are, in a fashion similar to that depicted in FIG. 4, switched to a phase detector 284. The phase detector 284 supplies a signal at an output 286 when the first unit or vehicle approaches the second unit or vehicle.

The signal "D" from the threshold circuit 280 is present at an input of a NAND-element 288. The "approach" signal from the output 286 of the phase detector 284 lies at the other input of the NAND-element 288. The output signal of the NAND-element 288 is inverted by means of an inverter 290. The inverter 290 supplies a signal "E." This signal "E" is in the position H when a sufficient Doppler signal is present in the frequency range of interest here, and this Doppler signal signals that the first unit or vehicle is approaching the second unit or vehicle.

The filtered Doppler signal from the output of the programmable filter 274 is applied via an amplifier 292 in parallel to three phase locked loops 294, 296, and 298.

The phase locked loops 294, 296 and 298 consitute components MC 14 046 B of the type already described in connection with FIG. 7. The voltage-controlled oscillators 210 of the different phase locked loops 294, 296 and 298 are switched such that they supply different reference frequencies at the output 234. These reference frequencies are switched to the respective input 218. The Doppler signals from the filter 274 lie at the inputs 216. The reference frequencies are set at values, one of which corresponds to a lower approach speed, another to a medium speed, and a still further one to a high approach speed. Corresponding output signals appear at the outputs 230 (FIG. 7) of the phase locked loops 294, 296 and 298, when the thus received Doppler signals are in a lower, medium, or higher frequency range, respectively. The output signals of the phase locked loops 294, 296 and 298 lie at first inputs of each one of NAND-elements 300, 302 and 304. The signal "E" from the output of the inverter 290 lies at the second inputs of the NAND-elements 300, 302 and 304, respectively. The output signals of the NAND-elements 300, 302 and 304 are inverted by means of respective inverters 306, 308 or 310 and control an indicating device 312 which indicates the classified approach speed.

The output signal of the phase detector 284 is further switched to a first input of a NAND-element 316 by means of an inverter 314. The signal "D" from the output 282 of the threshold circuit 280 is switched to the second input of the NAND-element. The indicating device 312 can be switched off from the output of the NAND-element via connection 318.

An apparatus of the described type is especially advantageous for units or vehicles driving in a convoy where the danger of collisions is especially great. The use of a proximity warning apparatus allows this danger to be reduced and, where applicable, allows units or vehicles driving in a convoy to drive at a higher speed and/or with shorter distances therebetween. The apparatus can be arranged such that Doppler signals are not only obtained from immediately preceding units or vehicles but also from units or vehicles driving further ahead, or behind, or at any angle other than 90° from the forward velocity vector.

While the invention has been described above in detail with reference to specific embodiments, various changes and modifications which fall within the spirit of the invention and scope of the appended claims, will become apparent to those skilled in the art. The invention is therefore considered to be limited only by the appended claims or their equivalents.

What I claim is:

1. An apparatus for producing velocity signals in accordance with the relative velocity between a first and second unit, while both are moving relative to a surface, comprising:
    a radar frequency oscillator for producing output radar frequency signals;
    a horn connected to the oscillator for directing the output radar frequency signals and for receiving return radar frequency signals;
    a return signal splitter connected to the horn for splitting the return signals into two paths;
    a phase shifter connected to the splitter for phase shifting the return signals to sine and cosine signals;
    sine and cosine amplifiers respectively connected to sine and cosine signals for amplifying the sine and cosine signals;
    first and second programmable low-pass filters respectively connected to the sine and cosine amplifiers;
    a velocity determiner connected to one of the amplifiers;
    a threshold circuit connected to the velocity determiner, the threshold circuit having an output;
    a phase detector connected to the first and second programmable low-pass filters;
    first and second outputs connected to the phase detector;
    first and second NAND gates having first inputs respectively connected to the first and second outputs of the phase detector, the threshold circuit output being connected to the second inputs of the first and second NAND gates;
    a green indicator connected to an output of the first NAND gate; and
    a red indicator connected to an output of the second NAND gate.

2. The apparatus of claim 1, further comprising a third amplifier connected to the second programmable low-pass filter output, a frequency-to-voltage converter connected to the third amplifier, and a velocity indicator connected to the converter.

3. The apparatus of claim 2, further comprising an inverter connected to the output of the first NAND gate and having an output connected to the velocity indicator for enabling the velocity indicator only for approach velocity.

4. An apparatus for producing velocity signals in accordance with the relative velocity between a first and second unit, while both are moving relative to a surface, comprising:
    a radar frequency oscillator for producing output radar frequency signals;
    a horn connected to the oscillator for directing the output radar frequency signals and for receiving return radar frequency signals;
    a return signal splitter connected to the horn for splitting the return signals into two paths;
    a phase shifter connected to the splitter for phase shifting the return signals to sine and cosine signals;
    sine and cosine amplifiers respectively connected to sine and cosine signals for amplifying the sine and cosine signals;
    first and second programmable low-pass filters respectively connected to the sine and cosine amplifiers;
    a velocity determiner connected to one of the amplifiers;
    a threshold circuit connected to the velocity determiner, the threshold circuit having an output;
    a phase detector connected to the first and second programmable low-pass filters;
    first and second outputs connected to the phase detector;
    an analog-to-digital converter connected to the output of the first programmable low-pass filter;
    a dual port RAM connected to an output of the analog-to-digital converter;
    a fast Fourier transform processor connected to the RAM;
    a timing and control unit connected to the converter and to the RAM;
    an address generator connected to the timing and control unit;
    a demultiplexer logic circuit connected to the address generator and to the RAM and to the phase detector; and
    an indicator connected to the demultiplexer logic circuit.

5. The apparatus of claim 4, further comprising a rate of change logic circuit connected to the demultiplexer logic circuit and to the phase detector, and an excessive closing rate indicator connected to the rate of change logic circuit.

6. An apparatus for producing velocity signals in accordance with the relative velocity between a first and second unit, while both are moving in the same direction relative to a surface, comprising:
    a dual sensing channel Doppler module having a continuous wave signal transmitter and a Schottky barrier mixer cavity which is attached to the first unit and targets the second unit for receiving return signals and removing the continuous wave signals;
    a splitter and phase shifter connected to the mixer cavity for producing first and second phase displaced Doppler signals;
    a velocity determiner connected to one of the Doppler signals;
    a signal processor receiving the first and second phase displaced Doppler signals, the signal Processor having first and second continuously programmable low-pass filters having control inputs connected to the velocity determiner for separately producing first and low-pass second outputs;
    said signal processor being equipped by the velocity determiner for removing around speed Doppler signal and for analyzing the remaining Doppler signal frequency spectrum and producing relative velocity signals from frequencies preselected by the continuously programmable low-pass filter within the Doppler signal frequency spectrum, which preselected frequencies lie outside the range of frequencies corresponding to the velocity of the first unit moving relative to the surface, wherein the filtering means are programmable filtering means having a variable frequency limit;

the signal-processor further contains velocity-determining means for supplying a signal dependent upon the velocity of the first unit moving relative to the surface; and control means for controlling the frequency limit of the filtering means is controlled in response to the signal dependent upon the velocity of the first unit moving relative to the surface, wherein the velocity-determining means are connected for receiving the Doppler signals and generating therefrom the signal dependent upon the velocity of the first unit moving relative to the surface, wherein the signal processor has a plurality of frequency comparison means responsive to a plurality of preselected frequencies below the range of frequencies corresponding to the velocity of the first unit moving relative to the surface; and an indicator is connected to be triggered by output signals of the frequency comparison means for indicating the Doppler frequency range and conjointly therewith the classification of the velocity at which the first unit approaches the second unit, and wherein the frequency comparison means are phase locked loops.

7. The apparatus as claimed in claim 6, wherein the Doppler signal transmitter and the signal processor contain a direction-sensitive circuit for producing output signals indicative of whether the targeted second unit approaches or moves away from the first unit, wherein said preselected frequencies encompass only frequencies below the range of frequencies corresponding to the velocity of the first unit moving relative to the surface,. and wherein the signal processor low-pass filters comprise filtering means for filtering the Doppler signals and which pass signals only up to a frequency limit below the range of frequencies corresponding to the velocity of the first unit moving relative to the surface.

8. The apparatus as claimed in claim 6, wherein the signal processor further comprises:

Fourier transform means for producing and storing the frequency spectrum of the doppler signal, and means which react to the Doppler signal within a preselected frequency range outside the range of frequencies corresponding to the velocity of the first unit moving relative to the surface, and wherein the signal processor further contains means responsive to changes in the frequency of the energy of the Doppler signal in the aforementioned frequency range.

9. An apparatus for producing velocity signals in accordance with the relative velocity between a first and second unit, while both are moving in the same direction relative to a surface, comprising a dual sensing channel Doppler module having a radar frequency generator which is attached to the first unit and targets the second unit, the Doppler module having a horn for transmitting an unmodulated continuous wave signal and for receiving the continuous wave signal returning from the targeted second unit with Doppler shift, a splitter and a phase shifter connected to the horn for providing base band phase related Doppler signals, a base band signal processor for receiving the phase related Doppler signals from the Doppler module, wherein the signal processor contains parallel programmable low-pass filters for separately filtering the phase related Doppler signals and for separately passing the base band phase related Doppler signals only up to a frequency limit below a range of frequencies corresponding to velocity of the first unit moving relative to the surface, and wherein the parallel programmable filtering means are parallel programmable filtering means having variable frequency limits, a velocity indicator connected to one of the Doppler signals and to the low-pass filters for supplying a signal dependent upon the velocity of the first unit moving relative to the surface, and control means connected to the means for supplying and connected to the parallel programmable filtering means for controlling the base band frequency limit of the parallel programmable filtering means in response to the signal dependent upon the velocity of the first unit moving relative to the surface, wherein the signal processor contains phase detector direction-sensitive means for detection of phase shift and for producing output signals indicative of whether the targeted second unit approaches or moves away from the first unit, wherein the signal processor further contains means responsive to changes in frequency of the Doppler signal in the aforementioned frequency range, wherein the signal processor further comprises velocity-determining means connected for receiving the Doppler signals and generating therefrom the signal dependent upon the velocity of the first unit moving relative to the surface, wherein the signal processor has a plurality of frequency comparison means responsive to a plurality of preselected frequencies below the range of frequencies corresponding to the velocity of the first unit moving relative to the surface, and an indicator is connected to be triggered by output signals of the frequency comparison means for indicating the Doppler frequency range and conjointly therewith the classification of the velocity at which the first unit approaches the second unit, and wherein the frequency comparison means are phase locked loops.

* * * * *